(12) United States Patent
Platini et al.

(10) Patent No.: US 11,880,772 B2
(45) Date of Patent: Jan. 23, 2024

(54) METHOD FOR AUTOMATICALLY ANALYZING TRANSACTION LOGS OF A DISTRIBUTED COMPUTING SYSTEM

(71) Applicant: BULL SAS, Les Clayes-sous-Bois (FR)

(72) Inventors: Marc Platini, Grenoble (FR); Benoît Pelletier, Saint Etienne de Crossey (FR); Loïc Pauletto, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 373 days.

(21) Appl. No.: 17/244,848

(22) Filed: Apr. 29, 2021

(65) Prior Publication Data

US 2021/0342702 A1    Nov. 4, 2021

(30) Foreign Application Priority Data

Apr. 30, 2020   (EP) .................................. 20305418

(51) Int. Cl.
*G06N 3/088* (2023.01)
*G06F 40/279* (2020.01)
(Continued)

(52) U.S. Cl.
CPC .......... *G06N 3/088* (2013.01); *G06F 40/166* (2020.01); *G06F 40/279* (2020.01); *G06N 3/044* (2023.01)

(58) Field of Classification Search
CPC ...... G06N 3/088; G06N 3/044; G06F 40/166; G06F 40/279
See application file for complete search history.

(56) References Cited

U.S. PATENT DOCUMENTS

2017/0293542 A1   10/2017  Xu et al.
2019/0243743 A1    8/2019  Saxena et al.

FOREIGN PATENT DOCUMENTS

WO          2017/087440 A1    5/2017
WO      WO-2021067858 A1 *   4/2021    .......... G06F 11/0751

OTHER PUBLICATIONS

Yu, et al., "DeepHTTP: Semantics-Structure Model with Attention for Anomalous HTTP Traffic Detection and Pattern Mining", Detection and Pattern Mining. In Proceedings of ACSAC 2018. ACM, New York, NY, USA, 11 pages.
(Continued)

*Primary Examiner* — Asher D Kells
(74) *Attorney, Agent, or Firm* — ARC IP Law, PC; Joseph J. Mayo

(57) ABSTRACT

The invention relates to a method for automatically analyzing a transaction log of a distributed computing system comprising a plurality of lines. The method includes, for each line, cutting the line into words, constructing a comparison vector by comparing the line with the other lines of the same size as the line, constructing a pattern from the comparison vector, and creating an event per pattern. The invention includes constructing a prediction model by training an artificial neural network on a group of training events, the prediction model being configured to predict the next event in the transaction log. The invention includes, for at least one event, using the prediction model to predict the event, from a group of prediction events, and generating from the prediction model, a causal graph of the event comprising a causal relation for each event of the group of prediction events responding to a relevance condition.

9 Claims, 3 Drawing Sheets

(51) Int. Cl.
*G06F 40/166* (2020.01)
*G06N 3/044* (2023.01)

(56) References Cited

OTHER PUBLICATIONS

Brown, et al., "Recurrent Neural Network Attention Mechanisms for Interpretable System Log Anomaly Detection". In Proceedings of ACM HPDC (First Workshop on Machine Learning for Computer Systems). 2018; ACM, New York, NY, USA, 8 pages.
Written Opinion issued in EP20305418.4, dated Oct. 19, 2020 (8 pages).

* cited by examiner

METHOD FOR AUTOMATICALLY ANALYZING TRANSACTION LOGS OF A DISTRIBUTED COMPUTING SYSTEM

BACKGROUND OF THE INVENTION

Field of the Invention

The technical field of the invention is that of distributed computing systems and in particular that of analysing transaction logs of distributed computing systems.

The present invention relates to a method for analysing at least one transaction log of a distributed computing system and in particular a method for automatically analysing at least one transaction log of a distributed computing system.

Description of the Related Art

The transaction logs of distributed computing systems are very useful sources of information in many cases such as for example, discovering the root case of an error, assistance with installation or automatic "debugging".

However, fully analysing these transaction logs by a user, in particular identifying the events that have occurred and the causal relations between the different events identified, is extremely difficult and even impossible in certain cases, even for an experienced user.

A first problem encountered by a user is the difficulty in analysing a file of the size of a transaction log, which, in the case of large-scale distributed computing systems and in particular supercomputers such as HPC (for "High-Performance Computing"), can reach several hundred million lines.

A second problem encountered by a user is the difficulty in establishing causal links between several events each associated with several lines, sometimes separated between them by several lines associated with other events. Indeed, for a given node of the distributed computing system, a transaction log aggregates by date of receipt, messages coming from several sources, such as for example from services proposed by the distributed computing system or other elements of the distributed computing system, such as for example the other nodes. Given that each source sends messages independently of the other sources, the order of the messages in the transaction log is random, which makes it difficult for a user to determine causal relations between the different messages.

To resolve the first problem, automatic line analysers have been developed. However, none of these analysers is capable of analysing hundreds of millions of lines in a reasonable amount of time, the fastest taking 48 hours, which is much too long in light of the filling speed of a transaction log.

In addition, the automatic analysers of the prior art used to establish causalities focus solely on one type of events, for example detecting HTTP traffic, and on transaction logs considered to be abnormal, and therefore do not conduct an analysis on all of the events that occurred in the transaction logs.

There is therefore a need for user to obtain an automatic and full analysis of the transaction logs of a distributed computing system, and in particular the causal relations between the different events that occurred, within a timeframe that is compatible with the filling time of a transaction log, i.e. within a maximum of one hour.

BRIEF SUMMARY OF THE INVENTION

The invention offers a solution to the problems mentioned hereinabove, by making it possible to conduct a full analysis of the transaction logs of a distributed computing system without the intervention of the user and in less than one hour.

A first aspect of the invention relates to a method for automatically analysing at least one transaction log of a distributed computing system, comprising a plurality of lines, the method comprising the following steps:

For each line of the transaction log:
  Cutting the line into words and associating the line with a size that is defined as the number of words;
  Constructing a comparison vector by comparing the line with the other lines of the transaction log associated with the same size as said line;
  Constructing a pattern from at least one word of the line from the comparison vector;
Creating an event per pattern;
Constructing at least one prediction model by training in an unsupervised manner an artificial neural network on a group of training events comprising at least one event, corresponding to a set of training lines comprising a plurality of lines of the transaction log, the prediction model being configured to predict the next event that will take place in the transaction log;
For at least one event:
  Using the prediction model to predict the event as the next event that will take place in the transaction log, from a group of prediction events comprising at least one event having taken place before the event in the transaction log;
  Generating from the prediction model, a causal graph of the event comprising a causal relation for each event of the group of prediction events responding to a relevance condition.

Thanks to the invention, events are automatically identified from lines of a transaction log and a causal graph can be generated automatically for each event of the transaction log. An aggregate view of the transaction log that identifies the causalities between the events of the same transaction log or between the events of several transaction logs, is thus obtained. The method according to the invention makes it possible to analyse about 600 million lines in about 150 seconds and can advantageously be implemented by multi-threading.

In addition to the characteristics that have just been mentioned in the preceding paragraph, the method according to the first aspect of the invention can have one or more additional characteristics among the following, considered individually or according to any technically permissible combination.

According to an alternative embodiment, each word is associated with a position on the line and the method according to the invention further comprises a step of replacing each word with a descriptor, the comparison vector comprising for each word, an occurrence corresponding to the number of times where the descriptor corresponding to the word appears at the position associated with the word, in another line of the transaction log associated with the same size as the line.

Thus, by choosing descriptors in a way that the total number of descriptors used for the lines of the transaction log is less than the total number of words of the lines of the transaction log, and that the long words are replaced with shorter descriptors, the computing time and the memory resources used are reduced.

According to a sub-alternative embodiment of the preceding alternative embodiment, the step of constructing the comparison vector is carried out using a hash table comprising a plurality of keys each comprised of a descriptor and a position and each being associated with the occurrence corresponding to the number of times when the descriptor appears at the position in another line of the transaction log associated with the same size as the line.

Thus, instead of storing each descriptor associated with a word of each line in order to be able to conduct comparisons, a unique key per descriptor located at a given position is stored, which makes it possible to reduce the memory resources used.

According to a sub-alternative embodiment of the preceding alternative embodiment, compatible with the preceding sub-alternative embodiment, the pattern comprises each descriptor of the line associated with an occurrence appearing a maximum number of times in the comparison vector.

Thus, the pattern of a line corresponds to the constant portion of the line that makes it possible to identify a type of event.

According to an alternative embodiment compatible with the preceding alternative embodiments, the artificial neural network is an artificial neural network of the Long Short-Term Memory type.

Thus, the artificial neural network is an artificial neural network particularly adapted to the learning of time correlations, known to be very precise for Natural Language Processing.

According to an alternative embodiment compatible with the preceding alternative embodiments, each event is associated with the number of lines having for pattern the pattern corresponding to the event, the step of constructing the prediction model being carried out for at least one sub-group of events of the group of training events, each sub-group of events grouping together each event of the group of training events having the same cardinality, the cardinality of an event being defined as the power of 10 of the number of lines associated with the event.

Thus, a prediction model is constructed for a group of similar events and not for each event, which makes it possible to reduce the computing time and the memory resources used, and to increase the prediction performance.

According to an alternative embodiment compatible with the preceding alternative embodiments, the step of constructing the prediction model is preceded by a step of constructing, for each event, a numeric vector comprising a value of linguistic similarity for at least one other event.

Thus, the artificial neural network that uses the numeric vectors of a group of events to predict the next event, makes its prediction by taking account of the proximity in meaning between the words of the events of the group of events, which increases the precision of its prediction.

According to a sub-alternative embodiment of the preceding alternative embodiment, the step of constructing the numeric vector is carried out via the Word2vec model.

According to an alternative embodiment compatible with the preceding alternative embodiments, the artificial neural network comprises an attention layer and the step of using the prediction model comprises a sub-step of generating a weight vector by the attention layer, the weight vector comprising a weight for each other event of the group of prediction events.

Thus, the attention layer evaluates the importance of each event in the prediction provided by the artificial neural network to identify the causal relations between the predicted event and the events used for the prediction.

According to a sub-alternative embodiment of the preceding alternative embodiment, the relevance condition is verified for a given event if the weight of the weight vector corresponding to the event is greater than a threshold, the threshold being the sum of the average of the weights of the weight vector and of the standard deviation of the weights of the weight vector.

Thus, only the events associated with a sufficiently substantial weight are considered as having a causal relation with the predicted event.

According to a sub-alternative embodiment of the preceding alternative embodiment, compatible with the preceding sub-alternative embodiment, the attention layer is a Temporal Attention-Gated layer.

A second aspect of the invention relates to a computer program product comprising instructions that, when the program is executed on a computer, lead the latter to implement the steps of the method according to the invention.

The invention and its various applications shall be better understood when reading the following description and when examining the accompanying figures.

BRIEF DESCRIPTION OF THE DRAWINGS

The figures are presented for the purposes of information and in no way limit the invention.

DETAILED DESCRIPTION OF THE INVENTION

Unless mentioned otherwise, the same element appearing in different figures has a unique reference.

A first aspect of the invention relates to a method for automatically analysing at least one transaction log of a distributed computing system.

"Automatic analysis" means an analysis implemented by computer and conducted without any configuration of the user being required.

The method according to the invention is implemented by a computer comprising at least one processor and a memory.

The distributed computing system is for example a large-scale distributed computing system, such as for example a high-performance supercomputer also called HPC (for "High-Performance Computing") supercomputer.

Figure 2:
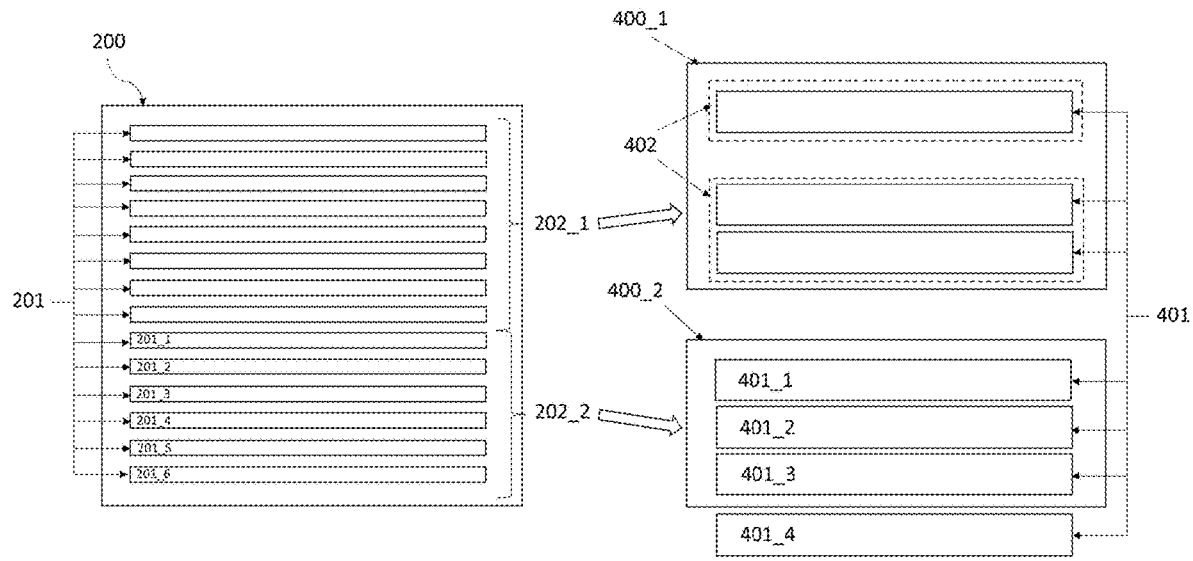
FIG. 2 is a diagrammatical representation of a transaction log and of several associated events obtained by the method according to the invention.

FIG. 2 shows a diagrammatical representation of a transaction log 200.

A transaction log 200 comprises a plurality of lines 201.

In FIG. 2, the transaction log 200 includes fourteen lines 201 divided into a first set 202_1 of lines 201 comprising eight lines 201, and a second set 202_2 of lines 201 comprising six lines 201 referenced as 201_1, 201_2, 201_3, 201_4, 201_5, 201_6.

Figure 1:
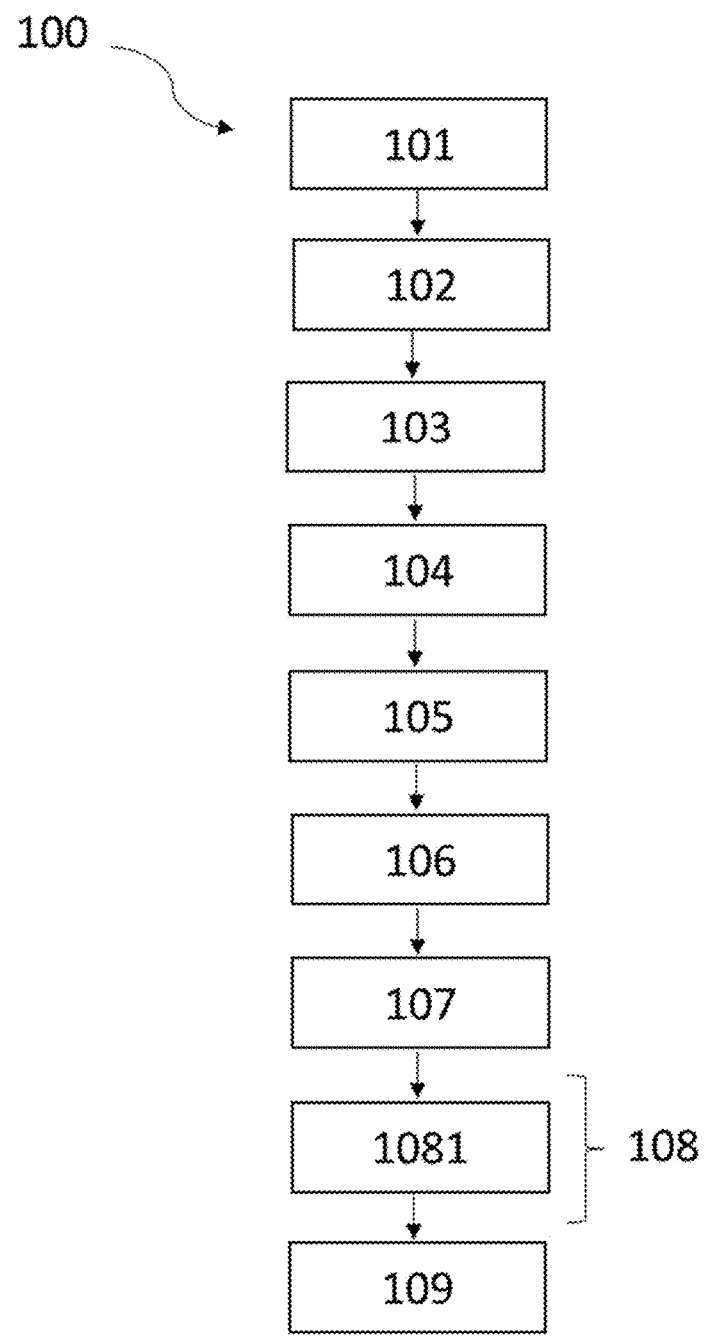
FIG. 1 is a block diagram showing the sequence of the steps of a method according to the invention.

FIG. 1 is a block diagram showing the sequence of the steps of the method 100 according to the invention.

A first step 101 of the method 100 consists in cutting each line 201 of the transaction log 200 into words.

For this, separators are used to separate two consecutive words, such as for example spaces and/or commas and/or semicolons and/or equal signs.

Consider an example wherein the transaction log 200 includes only the lines 201 of the second set 202_2 of lines 201 wherein:
the line 201_1 is: time wait exceeded to storage
the line 201_2 is: connection user A2563
the line 201_3 is: loss connection storage
the line 201_4 is: connection user D4567
the line 201_5 is: error access file image.png
the line 201_6 is: error access file save.png At the end of the first step 101, for the preceding example the following is obtained:
the line 201_1 is: [time] [wait] [exceeded] [to] [storage]
the line 201_2 is: [connection] [user] [A2563]
the line 201_3 is: [loss] [connection] [storage]
the line 201_4 is: [connection] [user] [D4567]
the line 201_5 is: [error] [access] [file] [image.png]
the line 201_6 is: [error] [access] [file] [save.png]
With each word placed between brackets.

Each word is associated with a position on the line 201. For example, in the line 201_2, the word [connection] is associated with the position 1, the word [user] with the position 2 and the word [A2563] with the position 3.

The first step 101 then consists in associating with each line 201 a size that corresponds to the number of words in the line 201.

Thus, for the preceding example:
the line 201_1 has a size value equal to 5.
the line 201_2 has a size value equal to 3.
the line 201_3 has a size value equal to 3.
the line 201_4 has a size value equal to 3.
the line 201_5 has a size value equal to 4.
the line 201_6 has a size value equal to 4.

The method 100 according to the invention can include a second step 102 consisting of replacing each word identified in the first step 101 with a descriptor.

For this, each word comprising only letters is for example associated with the word itself, each word comprising only alphanumeric characters with NB, and each other type of words with a vector including five inputs, the first input being a Boolean describing the presence or not of numerical characters, the second input being a Boolean describing the presence or not of upper-case letters, the third input being a Boolean describing the presence or not of lower-case letters, the fourth input being a Boolean describing the presence or not of non-alphanumerical characters, and the fifth input being the size of the word.

"The input is a Boolean describing the presence or not of an element" means that the input is 0 if the element is absent and 1 if the element is present.

Each other type of words could for example also be replaced with NB.

Thus, for the preceding example, at the end of the second step 102, the following is obtained:
the line 201_1 is: [time] [wait] [exceeds] [to] [storage]
the line 201_2 is: [connection] [user] [(1, 1, 0, 0, 5)]
the line 201_3 is: [loss] [connection] [storage]
the line 201_4 is: [connection] [user] [(1, 1, 0, 0, 5)]
the line 201_5 is: [error] [access] [file] [(1, 0, 0, 1, 9)]
the line 201_6 is: [error] [access] [file] [(1, 0, 0, 1, 8)]

A third step 103 of the method 100 consists of constructing a comparison vector for each line 201 of the transaction log 200.

The comparison vector of a line 201 is constructed by comparison between the line 201 and each other line 201 of the transaction log 200 having the same size as the line 201 for which the comparison vector is constructed.

Thus, returning to the preceding example, during the third step 103, the lines 201_2, 201_3 and 201_4 of size 3 are compared between them and the lines 201_5 and 201_6 of size 4 are compared between them.

In the case where the second optional step 102 was not carried out, the comparison vector comprises for example for each word of the line 201, the number of times when the word appears at the position associated with the word, in another line 201 of the transaction log 200 of the same size as the line 201 for which the comparison vector is constructed.

In the case where the second optional step 102 was carried out, the comparison vector comprises for example for each word of the line 201, the number of times when the descriptor that corresponds to the word appears at the position associated with the word, in another line 201 of the transaction log 200 of the same size as the line 201 for which the comparison vector is constructed.

Thus, for the preceding example, in the case where the second optional step 102 was carried out, at the end of the third step 103:
the line 201_1 has for comparison vector: (0, 0, 0, 0, 0)
the line 201_2 has for comparison vector: (1, 1, 1)
the line 201_3 has for comparison vector: (0, 0, 0)
the line 201_4 has for comparison vector: (1, 1, 1)
the line 201_5 has for comparison vector: (1, 1, 1, 0)
the line 201_6 has for comparison vector: (1, 1, 1; 0)

The third step 103 can be carried out using a hash table storing a plurality of keys each associated with an occurrence. Each key is comprised of a word or of a descriptor and of a position and the occurrence corresponds to the number of times when the word or descriptor appears at the position in another line 201 of the transaction log 200 associated with the same size as the line 201.

The number of keys stored in the hash table is then equal to the number of different words for each possible position for each line 201 of the transaction log 200.

A fourth step 104 of the method 100 consists of constructing a pattern for each line 201 of the transaction log 200, from the comparison vector constructed in the third step 103 for the line 201.

Each line 201 includes a constant portion and a variable portion, the constant portion being linked to a type of event that occurred and the variable portion, to the circumstances of the occurrence of the event.

For example, if the line is: connection user U1, the constant portion is connection user and the variable portion is U1. The type of event is therefore a connection of a user and the variable portion is the identifier of the user who has connected.

For example, if the line is: temperature change from 2 to 5, the constant portion is temperature change from*to*and the variable portion is 2*5. The type of event is therefore a temperature change and the variable portion is the value of the preceding temperature and the value of the current temperature.

The pattern corresponds to the constant portion of the line 201.

The pattern comprises for example each word or each descriptor of the line 201 associated with an occurrence appearing a maximum number of times in the comparison vector.

For example, if the comparison vector is [25, 16, 16, 16, 25, 1], the occurrence "25" appears twice, the occurrence "16" appears 3 times and the occurrence "1" appears once. The occurrence appearing a maximum number of times is therefore the occurrence "16" and the pattern therefore comprises the words or descriptors in position 2, 3 and 4 in the line 201.

Thus, for the preceding example:
- the pattern associated with the line 201_1 is: time wait exceeded to storage
- the pattern associated with the line 201_2 is: connection user (1, 1, 0, 0, 5)
- the pattern associated with the line 201_3 is: loss connection storage
- the pattern associated with the line 201_4 is: connection user (1, 1, 0, 0, 5)
- the pattern associated with the line 201_5 is: error access file
- the pattern associated with the line 201_6 is: error access file A fifth step 105 of the method 100 consists of creating an event 401 for each pattern constructed in the fourth step 104.

Thus, for the preceding example:
- an event 401_1 is created for the pattern: time wait exceeded to storage
- an event 401_2 is created for the pattern: connection user (1, 1, 0, 0, 5)
- an event 401_3 is created for the pattern: loss connection storage
- an event 401_4 is created for the pattern: error access file Each event 401 is associated with the number of lines 201 having for pattern the pattern corresponding to the event 401.

Thus, for the preceding example, the event 401_1 is associated with the line 201_1, the event 401_2 is associated with the two lines 201_2 and 201_4, the event 401_3 is associated with the line 201_3 and the event 401_4 is associated with the two lines 201_5 and 201_6.

The method 100 according to the invention can comprise a sixth step 106 consisting of constructing for each event 401, a numeric vector comprising a value of linguistic similarity for at least one other event 401.

Thus, the closer the pattern associated with a first event 401 has a meaning to that of the pattern associated with a second event 401, the greater the value of linguistic similarity between the first event 401 and the second event 401.

For example, if the first event 401 has for pattern [computer] and the second event 401 has for pattern [server], the value of linguistic similarity is substantial because the meaning of the two patterns is close. On the other hand, if the second event 401 has for pattern [user], the value of linguistic similarity will be lower because the meaning of the two patterns is farther apart.

The sixth step 106 is for example carried out by the model Word2vec. The model Word2vec is used for the lexical embedding and is comprised of artificial neural networks with two layers trained to reconstruct the linguistic context of the words.

The model Word2vec is for example trained on events 401 arranged in the same order as the corresponding lines 201 in the transaction log 200 so that the model Word2vec provides close numeric vectors for events 401 corresponding to lines 201 appearing consecutively in the transaction log 200.

The method 100 according to the invention includes a seventh step 107 consisting in constructing at least one prediction model that makes it possible to predict the next event 401 that will take place in the transaction log 200.

The prediction model is constructed by an artificial neural network by training it in an unsupervised manner on a training database including data linked to a group of training events 401.

In FIG. 2, the group 400_1 of training events 401 includes the events 401 corresponding to the first set 202_1 of lines 201 of the transaction log 200 used as a set 202_1 of training lines 201.

The set 202_1 of training lines 201 corresponds for example to 60% of the lines 201 of the transaction log 200.

In the case where the sixth step 106 was carried out, the training database comprises for example the numeric vectors associated with the events 401 of the group 400_1 of training events 401.

The artificial neural network is then for example trained on the numeric vectors associated with the events 401 of the group 400_1 of training events 401.

In the case where the sixth step 106 was not carried out, the training database comprises for example the group 400_1 of training events 401.

The artificial neural network is for example trained on the group 400_1 of training events 401.

An artificial neural network includes at least two layers each including at least one artificial neuron. A connection between two neurons is called a synapse. Each synapse is assigned to a synaptic coefficient.

Training an artificial neural network consists of determining the synaptic coefficients of the artificial neural network allowing it to perform the desired task from the training database.

The seventh step 107 therefore consists of determining the synaptic coefficients of the artificial neural network allowing it to predict the next event 401 that will take place in the transaction log 200 from the group 400_1 of training events 401.

The training is unsupervised therefore no additional information is provided to the artificial neural network.

Figure 3:
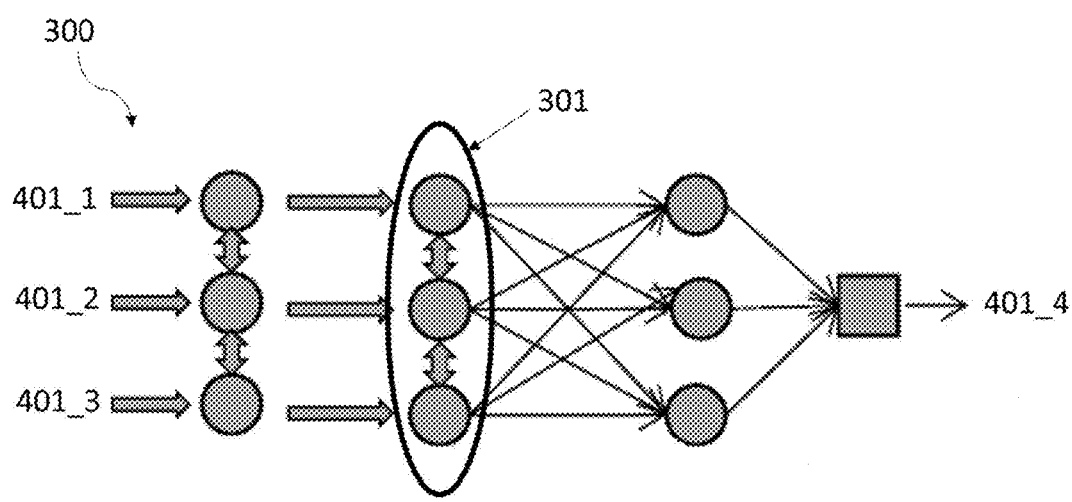
FIG. 3 is a diagrammatical representation of an artificial neural network allowing for the implementation of the method according to the invention.

FIG. 3 is a diagrammatical representation of the artificial neural network 300 used.

In FIG. 3, the artificial neural network 300 includes a first layer called input layer including three artificial neurons, a second layer including three artificial neurons, a third layer including three artificial neurons, and a fourth layer called output layer including an artificial neuron.

The output layer provides a prediction according to the input data provided to the input layer and to the synaptic coefficients of the artificial neural network 300.

Once the artificial neural network 300 is trained, the output layer provides the next event 401 that will take place in the transaction log 200.

The artificial neural network 300 is for example an artificial neural network of the Long-Short Term Memory type.

The seventh step 107 is for example carried out for at least one sub-group 402 of events 401 of the group 400_1 of training events 401 on which the artificial neural network 300 is trained, i.e. for at least one sub-group 402 of events 401 of the group 400_1 of training events 401, a prediction model associated with the sub-group 402 of events 401 is constructed.

The prediction model associated with a sub-group 402 of events 401 is configured to predict an event 401 belonging to the sub-group 402 of events 401.

A sub-group 402 of events 401 groups together for example a plurality of events 401 of the group 400_1 of training events 401 having the same cardinality.

"Cardinality of an event" means the power of 10 of the number of lines 201 associated with the event 401.

For example, if an event 401 is associated with 1135 lines 201, its cardinality is 3 since the event 401 is associated with $1.135 \times 10^3$ lines 201.

Thus, the prediction model associated with a sub-group 402 of events 401 of cardinality C is configured to predict an event 401 of cardinality C.

On the other hand, the training database used to construct a prediction model associated with a sub-group 402 of events 401 of cardinality C does not necessarily include only data linked to events 401 of cardinality C.

In FIG. 2, the group 400_1 of training events 401 comprises a first sub-group 402 of events 401 comprising an event 401 having a cardinality C1 and a second sub-group 402 of events 401 comprising two events 401 having a cardinality C2.

Thus, the method 100 according to the invention can for example comprise a first seventh step 107 that makes it possible to obtain a prediction model that predicts events 401 of cardinality C1 and a second seventh step 107 that makes it possible to obtain a prediction model that predicts events 401 of cardinality C2.

The artificial neural network 300 comprises for example an attention layer 301.

In FIG. 3, the second layer of the artificial neural network 300 is an attention layer 301 and the third layer is a fully-connected layer.

The attention layer 301 is for example a Temporal Attention-Gated layer.

The artificial neural network 300 is for example an artificial neural network of the bidirectional Long-Short Term Memory type comprising an input layer, 50 hidden layers, an attention layer 301, a fully-connected layer and an output layer.

The method 100 according to the invention comprises an eighth step 108 consisting, for a given event 401, of using the prediction model constructed at the seventh step 107 to predict the event 401, from a group of prediction events 401. The group of prediction events comprises at least one event 401 preceding the event 401 to be predicted in the transaction log 200.

The group of prediction events 401 comprises for example the thirty events 401 preceding the event 401 to be predicted, in the transaction log 200.

In FIGS. 2 and 3, the eighth step 108 consists of predicting, using the artificial neural network 300, the event 401_4 from the group 400_2 of prediction events 401 comprising the events 401_1, 401_2 and 401_3.

In the case where the seventh step 107 was carried out for a plurality of sub-groups 402 of events 401, the prediction model used in the eighth step 108 is the prediction model associated with a sub-group 402 of events 401 having the same cardinality as the event 401 to be predicted.

The eighth step 108 comprises for example a first sub-step 1081 consisting for the attention layer 301, of generating a weight vector. The weight vector comprises at least one weight for another event 401 of the group 400_2 of prediction events 401.

In the case shown in FIGS. 2 and 3, the attention layer 301 will generate a weight vector comprising a first weight associated with the event 401_1, a second weight associated with the event 401_2 and a third weight associated with the event 401_3. The weight vector is for example (0.5; 0.1; 0.8).

The method 100 according to the invention comprises a ninth step 109 consisting of generating for the event 401 for which the prediction model was used in the seventh step 107, a causal graph.

A causal graph comprises a causal relation with each other event 401 of the group 400_2 of prediction events 401 responding to a relevance condition.

The relevance condition is for example verified for an event 401 if the weight of the weight vector corresponding to the event 401 is greater than a threshold.

The threshold is for example the sum of the average of the weights of the weight vector and of the standard deviation of the weights of the weight vector.

Figure 4:
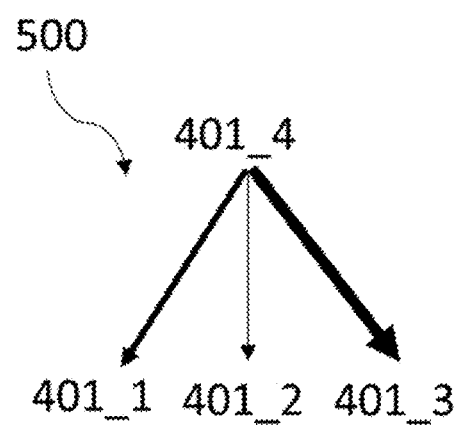
FIG. 4 is a diagrammatical representation of a causal graph generated by the method according to the invention for a given event.

FIG. 4 is a diagrammatical representation of a causal graph 500 generated at the eight step 108 of the method 100 according to the invention.

FIG. 4 shows the causal graph 500 generated for the event 401_4 of the second example.

In FIG. 4, the causal graph 500 comprises three arrows each representing a causal relation, a first causal relation with the event 401_1, a second causal relation with the event 401_2 and a third causal relation with the event 401_3.

In FIG. 4, the thicker the arrow is, the greater the weight associated with the event 401 in the weight vector and the more the event 401 for which the causal graph 500 is generated is linked to the event 401.

As the weight associated with the second event 401_3 is the most substantial in the weight vector, the event 401_3 is the one that has the most chance of training the event 401_4.

Returning to the preceding example, this means that the event 401_4 "error access file" is trained by the event 401_3 "loss connection storage" and not for example by the event 401_2 "connection user (1, 1, 0, 0, 5)".

What is claimed is:

1. A method for automatically analyzing a transaction log comprising at least one transaction log of a distributed computing system, comprising a plurality of lines, the method comprising:
  for each line of the plurality of lines of the transaction log
    cutting the each line into words and associating the each line with a size that is defined as a number of words;
    constructing a comparison vector by comparing the each line with other lines of the plurality of lines of the transaction log associated with a same size as said each line;
    constructing a pattern from at least one word of the each line from the comparison vector;
  creating an event per said pattern of said each line;
  constructing at least one prediction model by training in an unsupervised manner an artificial neural network on a group of training events comprising at least one event of said event per said pattern of said each line, corresponding to a set of training lines comprising said plurality of lines of the transaction log, the at least one prediction model being configured to predict a next event that will take place in the transaction log;
  for said at least one event
    using the at least one prediction model to predict the event as the next event that will take place in the transaction log, from a group of prediction events comprising at least one event having taken place before the event in the transaction log;
    generating from the at least one prediction model, a causal graph of the event comprising a causal relation for each event of the group of prediction events responding to a relevance condition.

2. The method according to claim 1, wherein each word of said at least one word is associated with a position on the each line and the method further comprises replacing said each word with a descriptor, the comparison vector comprising for said each word, an occurrence corresponding to a number of times where the descriptor corresponding to the each word appears at the position associated with the each word, in another line of the plurality of lines of the transaction log associated with the same size as the each line.

3. The method according to claim 2, wherein the constructing the comparison vector is carried out using a hash table comprising a plurality of keys each comprised of the descriptor and the position and each being associated with the occurrence corresponding to the number of times when the descriptor appears at the position in said another line of the plurality of lines of the transaction log associated with the same size as the each line.

4. The method according to claim 2, wherein the pattern comprises each descriptor of the each line associated with the occurrence appearing a maximum number of times in the comparison vector.

5. The method according to claim 1, wherein the artificial neural network is an artificial neural network of a Long Short-Term Memory type.

6. The method according to claim 1, wherein said each event is associated with a number of lines of said plurality of lines having the pattern corresponding to the each event, said constructing the at least one prediction model being carried out for at least one sub-group of events of the group of training events, each sub-group of events of the at least one sub-group of events grouping together said each event of the group of training events having a same cardinality, a cardinality of an event being defined as a power of 10 of the number of lines associated with the each event.

7. The method according to claim 1, wherein said constructing the at least one prediction model is preceded by constructing for said each event, a numeric vector comprising a value of linguistic similarity for at least one other event.

8. The method according to claim 1, wherein the artificial neural network comprises an attention layer and said using the at least one prediction model comprises a sub-step of generating a weight vector by the attention layer, the weight vector comprising a weight for said each event of the group of prediction events.

9. The method according to claim 8, wherein the relevance condition is verified for a given event of said each event if the weight of the weight vector corresponding to the each event is greater than a threshold, the threshold being a sum of an average of each weight for said each event of the weight vector and of a standard deviation of the weights of the weight vector.

* * * * *